United States Patent Office 2,960,834
Patented Nov. 22, 1960

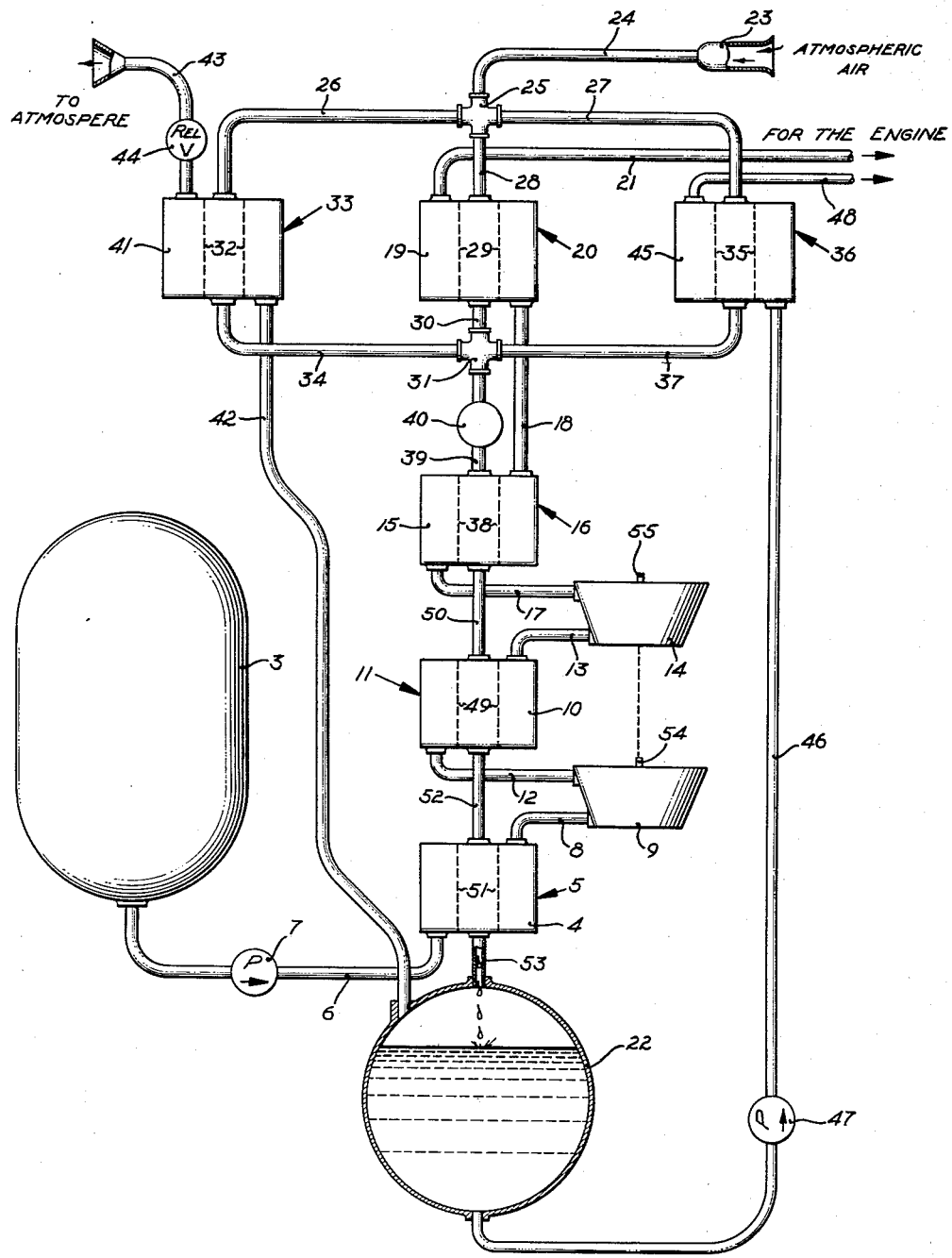

2,960,834

PRODUCTION OF LIQUID OXYGEN FROM ATMOSPHERIC AIR

Elizabeth M. Kirk Patrick, Venice, Calif., assignor, by mesne assignments, to The Garrett Corporation, Los Angeles, Calif., a corporation of California Filed Nov. 22, 1954, Ser. No. 470,236

6 Claims. (Cl. 62—7)

This invention relates to a method and apparatus for the production of liquid oxygen from atmospheric air and more particularly to a method and apparatus for producing liquid oxygen to be utilized as the oxidant for a non-air breathing engine utilized to propel a vehicle, such as an aircraft.

Non-air breathing engines of the type disclosed in pending U.S. patent application Serial No. 417,867 filed March 22, 1954, by Randolph Samuel Rae and entitled "Non-Air Breathing Engines" can utilize low temperature liquids as the fuel and oxidant. When such engines are utilized for propelling vehicles, such as aircraft, the liquid fuel and liquid oxidant can be carried in separate tanks within the vehicle and such tanks are supplied with sufficient amounts of the liquid substances to propel the vehicle for the required time. When the engine is used to propel an aircraft, it is obvious that unnecessary weight could be eliminated if the liquid oxidant were produced continually throughout the flight.

In U.S. Patent No. 2,922,286 granted January 26, 1960, to Randolph Samuel Rae, an invention is disclosed for producing liquid oxygen continuously throughout the flight of the aircraft so that only the amount of oxygen needed to maintain flight of the aircraft will be carried by the aircraft. In order to produce the liquid oxygen, air is taken from the atmosphere and passed through heat exchanger units so that the air temperature can be reduced sufficiently to liquify the oxygen in the air. The heat exchanger units are connected with the low temperature liquid fuel supply, such as hydrogen, with the liquid oxygen supply and with the cold nitrogen gas resulting from the continuous liquefaction of the oxygen in the air. In one modification disclosed in said application, a compressor is utilized to increase the pressure of the air being liquefied so that the liquefaction temperature of the oxygen can be increased when low atmospheric pressures are encountered at high altitudes. By thus compressing the air, less liquid hydrogen is needed to liquify the oxygen from the air.

By the present invention, it is proposed to increase the quantity of liquid oxygen which can be produced by the invention described in said application through the expediment of compressing the liquid fuel supply to a high pressure before it is utilized as a cooling medium. The fuel is passed through a plurality of heat exchangers to liquify the oxygen in the incoming air and between each heat exchanger, the fuel is passed through an expansion unit in order to reduce the temperature of the fuel before it enters the next heat exchanger. Since oxygen is liquified in each of the heat exchangers, more oxygen can be liquified with the same quantity of fuel than when low pressure fuel is passed through a single heat exchanger. Of course, the number of expansion stages and heat exchangers utilized for the fuel will be determined by the available pressure drop in fuel pressure. The power produced by the expansion units is available for driving the pump which raises the pressure of the liquid fuel. As in the previously mentioned application, a compressor can be used to increase the pressure of the air being liquified so that the liquefaction temperature of the oxygen can be increased.

While liquid hydrogen is the preferred fuel, it is understood that other low temperature fuels can replace the liquid hydrogen providing, of course, that the temperature of these other fuels is sufficiently below the liquefaction temperature of the oxygen. The type of engines which utilize low temperature fuels and oxidants are those which are satisfactory for underwater and high altitude operation where practically no air is available for the combustion of fuel in an internal combustion engine.

It is therefore an object of the present invention to provide a method and apparatus for producing liquid oxygen for an engine by utilizing a low temperature, high pressure fuel supply to liquify oxygen from atmospheric air.

Another object of the invention is to continually produce liquid oxygen for an engine from atmospheric air by cooling the air in a plurality of heat exchangers which receive low temperature fuel and by decreasing the temperature of the fuel between each heat exchanger by expanding the fuel.

These and other objects of the invention, not specifically set forth above, will become readily apparent from the accompanying description and diagrammatic drawing of the invention.

Referring to the drawing, a tank 3 for low temperature liquid hydrogen fuel is shown connected to the outer chamber 4 of heat exchanger 5 through passage 6 and pump 7. The liquid fuel is stored in a tank 3 at about atmospheric pressure and pump 7 raises the pressure of the fuel passing to chamber 4 to a high pressure, such as 1000 p.s.i. The fuel will enter the chamber 4 through passage 6 at about the temperature of liquid hydrogen and will leave the chamber through passage 8 at about the liquefaction temperature of oxygen. Passage 8 connects with an expansion turbine 9 where the high pressure fuel is expanded to lower its temperature to about the liquefaction of hydrogen. The expanded fuel is directed from turbine 9 to outer chamber 10 of heat exchanger 11 through passage 12, and leaves the heat exchanger 11 through passage 13 connecting with expansion turbine 14. In turbine 14, the fuel is again expanded to about the liquefaction temperature of hydrogen and is directed to outer chamber 15 of heat exchanger 16 through passage 17. Passage 18 connects the chamber 15 with outer chamber 19 of heat exchanger 20 and the fuel entering chamber 19 will be at about the liquefaction temperature of oxygen. The outer chamber 19 is directly connected to an engine (not shown) through passage 21 in order to supply hydrogen fuel in gaseous form at about ambient temperature to the engine.

The liquid oxygen and cold nitrogen gas produced by the invention is directed into tank 22 from heat exchanger 5. It is understood that hydrogen tank 3 and oxygen tank 22 can be mounted within any type of craft, such as an aircraft, and that the liquid hydrogen will be supplied to tank 3 prior to departure of the craft. An airscoop 23 is mounted exteriorly of the craft in the airstream so that it will receive atmospheric air. The airscoop connects through passage 24 and connection 25 with three passages 26, 27 and 28 so that the air taken in by the scoop will be divided between these passages. Passage 28 connects with inner chamber 29 of heat exchanger 20 and passage 30 connects the inner chamber 29 with a four-way fitting 31. Passage 26 connects with inner chamber 32 of heat exchanger 33 and this chamber is also connected with fitting 31 by means of a passage 34. In a similar manner, passage 27 connects to inner chamber 35 of heat exchanger 36 and this chamber is connected to fitting 31 by passage 37. The heat exchanger 16 has an inner chamber 38 which is connected to fitting 31 by a passage 39 so that all of the incoming air will pass through chamber 38. A compressor 40 is located in passage 39 in order to increase the pressure of the incoming air and thereby increase the liquefaction temperature of the oxygen in the air. Such increase in air pressure is desirable when low atmospheric pressures are encountered at high altitudes.

A portion of the incoming air will enter chamber 32 of heat exchanger 33 at about ambient temperature while outer chamber 41 of the heat exchanger is connected to tank 22 by passage 42 in order to receive nitrogen gas at a temperature corresponding to the temperature of the liquid oxygen. Thus, the air temperature in passage 34 will be at about the temperature of liquid oxygen. The outer chamber 41 exhausts to atmosphere through passage 43 which contains a relief valve 44 to maintain the desired pressure within tank 22 resulting from compressor 40. Another portion of the incoming air will enter chamber 35 of heat exchanger 36 at about ambient temperature while outer chamber 45 is connected to the bottom of tank 22 by passage 46 to receive oxygen being pumped to the engine by pump 47. Thus, the oxygen gas in passage 48, connecting chamber 45 to the engine, will be at about ambient temperature and the air leaving inner chamber 35 through passage 37 will be at about the temperature of liquid oxygen. Also, the portion of air entering inner chamber 29 of heat exchanger 20 will be discharged through passage 30 at about the liquefaction temperature of oxygen since the fuel entering chamber 19 is at about the same temperature. Therefore, all of the air in passage 39 will be precooled by heat exchangers 20, 33 and 36 to about the temperature at which the oxygen in the air will be liquified.

All of the precooled air will enter inner chamber 38 where an amount of oxygen will be liquified and pass, along with precooled air, to inner chamber 49 of heat exchanger 11 through passage 50. An additional amount of oxygen will be liquified in chamber 49 and all of the liquid, along with precooled air, will pass to inner chamber 51 of heat exchanger 5 through passage 52. The remaining oxygen in the air will be liquified in chamber 51 and all of the liquid, together with nitrogen gas at the liquefaction temperature will enter tank 22 through passage 53.

The expansion turbines 9 and 14 have shafts 54 and 55 which are connected together as illustrated and the power output of the turbines can be dissipated through a friction brake or can be used to drive auxiliary equipment such as pumps 7 and 47 and compressor 40. In operation of the invention, the high pressure of the fuel in passage 6 permits the fuel to be utilized in heat exchangers 5, 11 and 16 in order to liquify oxygen from the air since the fuel exhausted from heat exchangers 5 and 11 is at high enough pressure to permit expansion of the fuel to decrease its temperature to about the liquefaction temperature of the hydrogen. Thus, substantially more air can be taken in from the atmosphere and more liquid oxygen can be produced from the same amount of liquid fuel than when low pressure fuel is utilized for liquefaction of the oxygen. From the above description, it is apparent that an apparatus and method has been described in which air is taken from the atmosphere at atmospheric pressure and first cooled to about the liquefaction temperature of oxygen by the oxygen and hydrogen passing to the engine and by the nitrogen resulting from the liquefaction of oxygen from the air. The incoming air quantity is further cooled in a plurality of heat exchangers connected to the fuel supply to liquify the oxygen in the air. Thus, liquid oxygen will be continually produced in sufficient quantity for the engine and it is unnecessary for excess oxygen to be carried by the craft.

It is understood that expansion turbines 9 and 14 can be replaced by piston-type expansion engines or by expansion valves. Also, the number of expansion stages utilized will be determined by the available drop in pressure of the fuel between pump 7 and the engine. Thus, while two expansion stages are shown, it is contemplated that one or more stages can be utilized depending upon the drop in pressure of the fuel. Also, various other arrangements of heat transfer units are contemplated wherein the hydrogen and oxygen are passed to the engine and the resulting nitrogen is also discharged at about ambient temperature. For the purposes of this invention, atmospheric air is considered to be composed of oxygen and nitrogen since the other components of air form a negligible percentage. Various types of engines can be utilized with the fuel and oxidant supplies and as previously mentioned, other fuels besides hydrogen can be utilized. Other modifications are contemplated by those skilled in the art without departing from the spirit and scope of the invention as hereinafter defined by the appended claims.

What is claimed is:

1. A device for producing liquid oxygen from atmospheric air for use as an oxidant for an engine comprising means for taking a supply of air from the atmosphere, a supply of fuel under pressure and at a temperature below the liquefaction temperature of the oxygen in the air, a tank for receiving liquid oxygen, first heat exchanger means connected between said tank and said engine to precool a portion of said air with oxygen, second heat exchanger means connected between said tank and atmosphere to precool another portion of said air with nitrogen gas resulting from the liquefaction of oxygen, a plurality of heat exchanging means connected in series between said fuel supply and said engine to receive fuel under pressure, the last heat exchanger means of said series receiving another portion of said air for precooling, means for connecting the other heat exchanger means of said series with said first and second heat exchanger means in order to liquefy the oxygen from all the precooled air and discharge said liquefied oxygen and cold nitrogen gas to said tank, and expansion means connected between each of said other heat exchanger means to reduce the temperature of the fuel below the liquefaction temperature of the oxygen.

2. A device for producing liquid oxygen from air comprising a tank for storing a substance in liquid form at a temperature below that of the produced liquid oxygen, means for obtaining a supply of air from the atmosphere, first heat exchanger means connected with said air obtaining means for precooling said air and second heat exchanger means for liquifying the oxygen in said precooled air, means for connecting said second heat exchanger means with said first heat exchanger means to receive the precooled air discharged from said first heat exchanger means, and means connecting said second heat exchanger means with said substance in said tank for providing a cooling medium under pressure for liquifying the oxygen in said precooled air, said first heat exchanger means comprising three separate heat exchangers separately connected with said air obtaining means to receive and precool separate portions of said air, means for supplying each of said heat exchangers with a cooling fluid by connecting one of said heat exchangers with the liquid oxygen discharged from said second heat exchanger means, another of said heat exchangers with the nitrogen gas discharged from said second heat exchanger means and another of said heat exchangers with the cooling medium discharged from said second heat exchanger means, said second heat exchanger means comprising a plurality of heat exchanger units connected together in series with the first unit directly connected with said cooling medium and the last unit connected with said first heat exchanger means, and expansion means located in the connection between each of said units to reduce the temperature of said cooling medium leaving one unit and entering the next unit.

3. A device as claimed in claim 2 having a compressor positioned between said first and second heat exchanger means to increase the pressure of said precooled air and the liquification temperature of the oxygen in the air at the second heat exchanger means.

4. A device for producing liquid oxygen from atmospheric air comprising means for supplying air to said device, a supply of a high pressure substance below the liquefaction temperature of the oxygen in the air, first heat exchanger means comprising a plurality of heat exchanger stages connected together in series, means for introducing said substance to said first heat exchanger means at the first stage as the cooling medium to liquefy the oxygen in the air, expansion means in the connection between each of said stages of said first heat exchanger means for reducing the temperature of said substance between stages to a temperature below the liquefaction temperature of oxygen, second heat exchanger means comprising three separate heat exchange zones for precooling separate portions of the air prior to liquefaction in said first heat exchanger means, means for introducing all the precooled air to said first heat exchanger means, and means for supplying a cooling medium to each of said zones, said supplying means comprising means for connecting one of said zones with the low temperature substance discharged from the last of said stages at about oxygen liquefaction temperature, means for connecting another zone with liquid oxygen discharged from said first heat exchanger means, and means for connecting the third zone with nitrogen gas discharged from said first heat exchanger means.

5. A device for producing liquid oxygen from atmospheric air for use as an oxidant supply for an engine comprising means for supplying air to said device, a supply of high pressure fuel at a temperature below the liquefaction temperature of the oxygen in the air, first heat exchanger means comprising a plurality of heat exchanger stages arranged in series, means for introducing said fuel supply to said first exchanger means at the first stage for liquefying the oxygen in the air, expansion means in the connection between each of said stages for reducing the temperature of the fuel between stages to a temperature below the liquefaction temperature of the oxygen, second heat exchanger means comprising three separate heat exchange zones for precooling separate portions of the air prior to liquefaction in said first heat exchange means, means for introducing all the precooled air to said first heat exchanger means, and means for supplying a cooling medium to each of said zones, said supplying means comprising means for connecting one of said zones to the fuel discharged from the last of said stages at about oxygen liquefaction temperature, means for connecting another of said zones with the liquid oxygen discharged from said first heat exchanger means, and means for connecting the third of said zones with the nitrogen gas discharged from said first heat exchange means.

6. A device for producing liquid oxygen from atmospheric air comprising means for supplying air to said device, a supply of hydrogen under pressure and at a temperature below the liquefaction temperature of the oxygen in the air, first heat exchanger means comprising a plurality of heat exchange stages connected together in series, means for introducing the hydrogen to said first heat exchanger means at the first stage to liquefy the oxygen in the air, expansion means in the connection between each of said stages for reducing the temperature of said hydrogen between stages, second heat exchanger means comprising three separate heat exchange zones for precooling separate portions of the air prior to liquefaction in said first heat exchanger means, means for introducing the precooled air to said first heat exchanger means, and means for supplying a cooling medium to each of said zones, said supplying means comprising means for connecting one of said zones with the hydrogen leaving the last of said stages at about oxygen liquefaction temperature, means for connecting another of said zones with the liquid oxygen produced by said first heat exchanger means, and means for connecting the third of said zones with nitrogen gas produced by said first heat exchanger means.

References Cited in the file of this patent
UNITED STATES PATENTS

| | | |
|---|---|---|
| 2,552,561 | Jenny et al. | May 15, 1951 |
| 2,685,180 | Schlitt | Aug. 3, 1954 |

FOREIGN PATENTS

| | | |
|---|---|---|
| 736,486 | Germany | June 18, 1943 |

UNITED STATES PATENT OFFICE
CERTIFICATION OF CORRECTION

November 22, 1960

Patent No. 2,960,834

Elizabeth M. Kirk Patrick

It is hereby certified that error appears in the above numbered patent requiring correction and that the said Letters Patent should read as corrected below.

Column 1, line 58, for "expediment" read -- expedient --; column 4, line 36, for "exchanging" read -- exchanger --.

Signed and sealed this 27th day of June 1961.

(SEAL)
Attest:

ERNEST W. SWIDER
Attesting Officer

DAVID L. LADD
Commissioner of Patents